(12) United States Patent
Wing et al.

(10) Patent No.: US 9,854,000 B2
(45) Date of Patent: Dec. 26, 2017

(54) METHOD AND APPARATUS FOR DETECTING MALICIOUS SOFTWARE USING HANDSHAKE INFORMATION

(71) Applicants: Daniel G. Wing, San Jose, CA (US); Flemming S. Andreasen, Marlboro, NJ (US); Kent K. Leung, Palo Alto, CA (US)

(72) Inventors: Daniel G. Wing, San Jose, CA (US); Flemming S. Andreasen, Marlboro, NJ (US); Kent K. Leung, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 14/534,429

(22) Filed: Nov. 6, 2014

(65) Prior Publication Data

US 2016/0134646 A1    May 12, 2016

(51) Int. Cl.
 *G06F 11/00*  (2006.01)
 *H04L 29/06*  (2006.01)
(52) U.S. Cl.
 CPC .......... *H04L 63/166* (2013.01); *H04L 63/145* (2013.01); *H04L 63/1408* (2013.01)
(58) Field of Classification Search
 CPC .......................... H04L 63/1416; H04L 63/166
 USPC .............................................................. 726/23
 See application file for complete search history.

(56) References Cited

U.S. PATENT DOCUMENTS

| | | | |
|---|---|---|---|
| 8,646,041 B2 | 2/2014 | Urien | |
| 9,152,815 B2* | 10/2015 | Baentsch | G06F 21/6218 |
| 2002/0199119 A1* | 12/2002 | Dunnion | H04L 12/58 |
| | | | 726/4 |
| 2003/0145233 A1* | 7/2003 | Poletto | H04L 63/1408 |
| | | | 726/22 |
| 2010/0257588 A1* | 10/2010 | Urien | H04L 9/321 |
| | | | 726/3 |
| 2011/0131654 A1* | 6/2011 | Taneja | H04L 63/1416 |
| | | | 726/23 |
| 2011/0247057 A1* | 10/2011 | Baentsch | G06F 21/84 |
| | | | 726/5 |
| 2012/0174196 A1* | 7/2012 | Bhogavilli | H04L 63/1458 |
| | | | 726/5 |
| 2013/0081129 A1 | 3/2013 | Niemela | |
| 2014/0283057 A1* | 9/2014 | Mahvi | H04L 63/1408 |
| | | | 726/23 |

* cited by examiner

Primary Examiner — Teshome Hailu
(74) Attorney, Agent, or Firm — P. Su

(57) ABSTRACT

In one embodiment, a method includes identifying unusual behavior with respect to a handshake between a first endpoint and a second endpoint that are included in a network, and determining whether the unusual behavior with respect to the handshake indicates presence of malicious software. The method also includes identifying at least one of the first endpoint and the second endpoint as potentially being infected by the malicious software if it is determined that the unusual behavior with respect to the handshake indicates the presence of malicious software.

3 Claims, 7 Drawing Sheets

METHOD AND APPARATUS FOR DETECTING MALICIOUS SOFTWARE USING HANDSHAKE INFORMATION

TECHNICAL FIELD

The disclosure relates generally to providing security in networks. More particularly, the disclosure relates to using information related to abandoned Transport Layer Security (TLS) or Secure Socket Layer (SSL) connection handshakes to assess whether the presence of malicious software is indicated.

BACKGROUND

The existence of malicious software in a network typically causes performance and/or security issues in the network. Malicious software running in a network often must communicate outside of the network, as for example with a command-and-control (C&C) server. Communications between malicious software and a C&C server may attempt to appear as "normal" encrypted traffic to escape detection by network security elements.

For encrypted Transport Layer security (TLS) traffic or encrypted Secure Sockets Layer (SSL) traffic, an organization or an enterprise that is attempting to detect traffic associated with malicious software may leverage TLS interception proxies or SSL interception proxies in their networks. For an interception proxy to perform intended functions, a client generally accepts a root certificate provided by the proxy. Interception proxies may be identified by malicious software operating on a client and, as a result, the malicious software may take appropriate steps to avoid being detected. For example, malicious software may avoid exchanging C&C traffic or use different formats of C&C traffic in an effort to escape detection.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
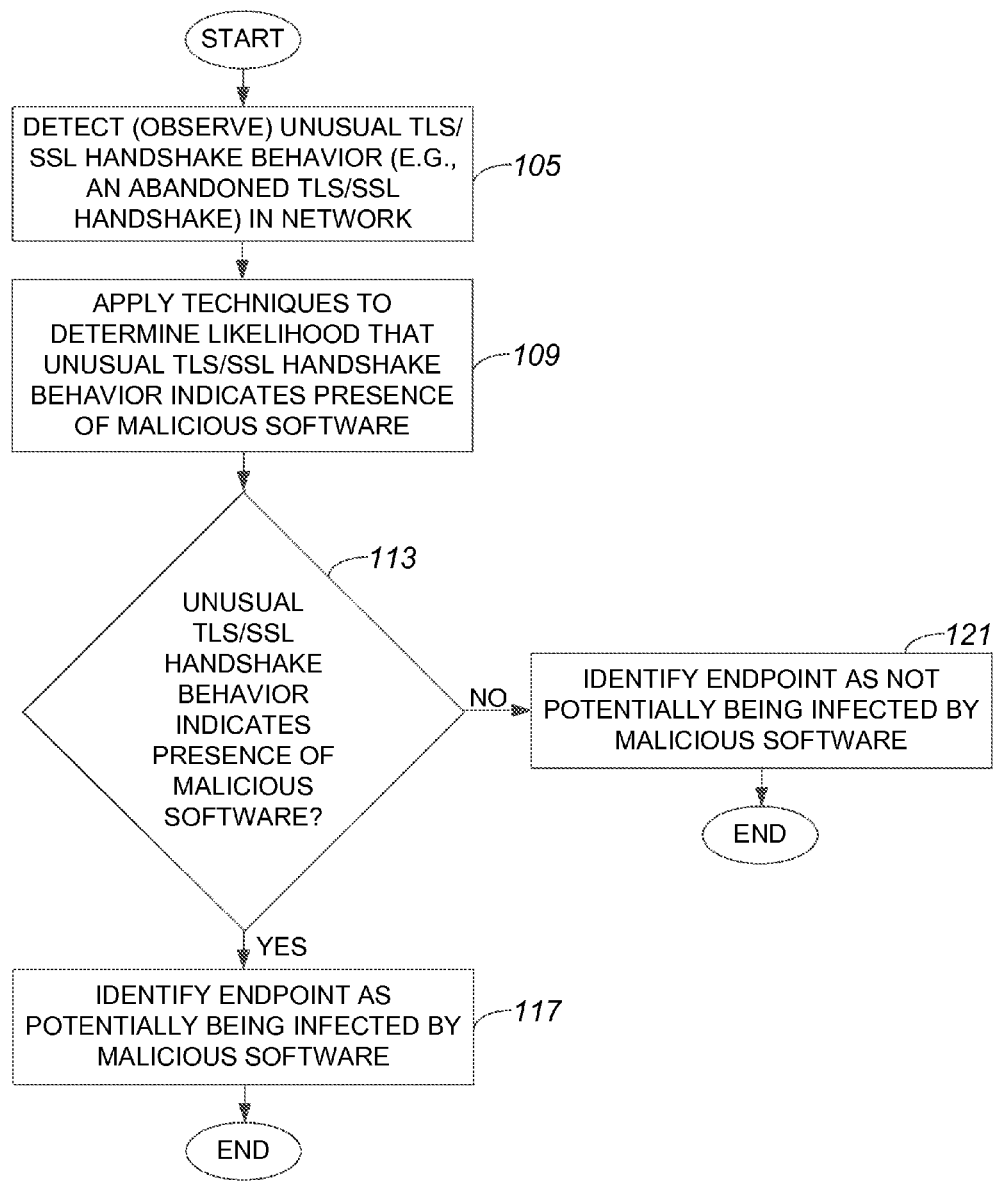
FIG. 1 is a process flow diagram which illustrates a method of determining when an endpoint is potentially infected by malicious software in accordance with an embodiment.

According to one aspect, a method includes identifying unusual behavior with respect to a handshake between a first endpoint and a second endpoint that are included in a network, and determining whether the unusual behavior with respect to the handshake indicates presence of malicious software. The method also includes identifying at least one of the first endpoint and the second endpoint as potentially being infected by the malicious software if it is determined that the unusual behavior with respect to the handshake indicates the presence of malicious software.

Description

Secure Sockets Layer (SSL) is a protocol associated with transferring information securely across a network, e.g., the Internet. Transport Layer Security (TLS) is a protocol similar to SSL. Both SSL and TLS are cryptographic protocols that allow secure communications across a network.

When endpoints, as for example a client endpoint and a server endpoint, communicate, SSL and/or TLS may effectively ensure that a connection between the endpoints is secure by authenticating the endpoints, and encrypting information exchanged between the endpoints. Digital certificates are often used to allow one endpoint to effectively confirm or verify the identity of another endpoint.

The ability to detect malicious software running on a client within a network allows actions to be taken to protect the security of the client, and, hence, to protect the security of the network. When malicious software is running on a client, the client may be considered to be infected, compromised, or contaminated. Malicious software, or malware, is generally intrusive software that is used to breach computer systems such that protected information may be accessed. Malicious software may be considered to be a computer contaminant, and typically includes, but is not limited to including, computer viruses, spyware, and any other software that is considered to be intrusive.

Legitimate software, or software that is not malicious software, which is running on an endpoint within a network of an enterprise or company generally allows its connections to be proxied by interception proxies. For example, legitimate software running on an Information Technology (IT) managed device in a network of an enterprise will allow its TLS or SSL (TLS/SSL) connections to be proxied by IT-managed TLS/SSL proxies. However, malicious software may attempt to avoid being detected within a network of an enterprise by not allowing its connections to be proxied by IT-managed TLS/SSL proxies of the enterprise. As such, malicious software may abandon a TLS/SSL connection handshake upon detecting an attempt by an IT-managed TLS/SSL proxy to proxy into a connection. In one embodiment, when an abandoned TLS/SSL connection handshake between endpoints is detected within a network, at least one of the endpoints may be identified as likely infected by malicious software.

By effectively monitoring or otherwise examining the behavior of an endpoint, it may be determined whether the behavior of the endpoint when a TLS/SSL interception proxy is being inserted deviates from its standard behavior. If the behavior of the endpoint when a TLS/SSL interception proxy is being inserted differs from its standard behavior, e.g., when unusual TLS/SSL handshake behavior is detected with respect to the endpoint, then the indication is that software on the endpoint may be sensitive to the TLS/SSL interception proxy. Such sensitivity may be indicative of software that is attempting to escape detection and, thus, increases the probability or chances that the software is malicious software.

As will be appreciated by those skilled in the art, a TLS/SSL handshake protocol allows for a secure exchange of identity certificates and keys between two endpoints, e.g., a client endpoint and a server endpoint, and allows for a secure transport layer to be established for use by higher layer protocols. That is, a TLS/SSL handshake protocol allows for authentication and key exchanges such that secure communications sessions may be established. When malicious software is attempting to avoid detection within a network, the malicious software may effectively prevent a TLS/SSL connection from being proxied by a TLS/SSL proxy and, hence, may cause a TLS/SSL connection handshake to be substantially abandoned. For example, malicious software may detect a TLS/SSL proxy, and may abandon TLS/SSL connections until an infected endpoint is located outside an enterprise.

Referring initially to FIG. 1, a method of identifying whether an endpoint within a network is likely to be infected or otherwise compromised by malicious software will be described in accordance with an embodiment. A method 101 of identifying whether an endpoint, or a client, within a network is likely to be infected or otherwise compromised by malicious software begins at step 105 in which a node in the network detects or observes unusual TLS/SSL handshake behavior, e.g., an abandoned TLS/SSL handshake, in the network. It should be appreciated that in lieu of detecting an abandoned TLS/SSL handshake, other unusual TLS/SSL handshake behavior may be detected. Other unusual TLS/SSL handshake behavior may include, but is not limited to including, a TLS/SSL handshake that is completed but then abandoned.

The unusual TLS/SSL handshake behavior occurs as a result of the existence of a TLS/SSL interception proxy, in one embodiment. As will be appreciated by those skilled in the art, malicious software may be arranged not to allow its connections to be proxied by TLS/SSL interception proxies. Accordingly, malicious software may abandon a TLS/SSL handshake upon detection of a TLS/SSL interception proxy.

Techniques are applied in step 109 to determine a likelihood that the unusual TLS/SSL handshake behavior, e.g., an abandoned TLS/SSL handshake, indicates presence of malicious software on an endpoint within the network. Techniques which may be used to assess a likelihood that unusual TLS/SSL handshake behavior indicates the presence of malicious software involve, but are not limited to involving, processing telemetry data and/or historical data, and comparing the data to the unusual TLS/SSL handshake behavior. Such techniques or methods may effectively prevent, or at least reduces the occurrences of, identifying an endpoint as being infected by malicious software when the endpoint is not actually infected by malicious software. Suitable techniques for determining a likelihood that unusual TLS/SSL behavior indicates presence of malicious software, e.g., suitable techniques that reduce the likelihood of incorrectly identifying unusual TLS/SSL behavior as indicating the presence of malicious software, will be discussed below with respect to FIGS. 5A-C.

In step 113, a determination is made as to whether the unusual TLS/SSL handshake behavior likely indicates the presence of malicious software with respect to an endpoint. Factors used to determine whether the unusual TLS/SSL handshake behavior likely indicates the presence of malicious software may vary widely. Such factors include, but are not limited to including, the characteristics of the unusual TLS/SSL handshake behavior, whether the unusual TLS/SSL handshake behavior has historically been associated with the presence of malicious software, and/or whether relatively recent changes in TLS/SSL handshake behavior have occurred.

If it is determined in step 113 that the unusual TLS/SSL handshake behavior likely does not indicate the presence of malicious software, then process flow proceeds to step 121 in which the endpoint is not identified as being potentially infected by malicious software, and the method of identifying whether an endpoint is likely to be infected by malicious software is completed. Alternatively, if it is determined in step 113 that the unusual TLS/SSL handshake behavior is likely to indicate the presence of malicious software with respect to an endpoint, then the endpoint is identified as potentially being infected by malicious software in step 117. Identifying the endpoint as potentially being infected by malicious software may include, but is not limited to including, flagging the endpoint for additional observation, trapping additional details with respect to the endpoint, and/or quarantining the endpoint. It should be appreciated that once an endpoint is identified as potentially being infected or otherwise compromised by malicious software, a network administrator may take appropriate action with respect to the endpoint. Once the endpoint is identified as potentially being infected by malicious software, the method of identifying whether an endpoint is likely to be infected by malicious software is completed.

Figure 2:
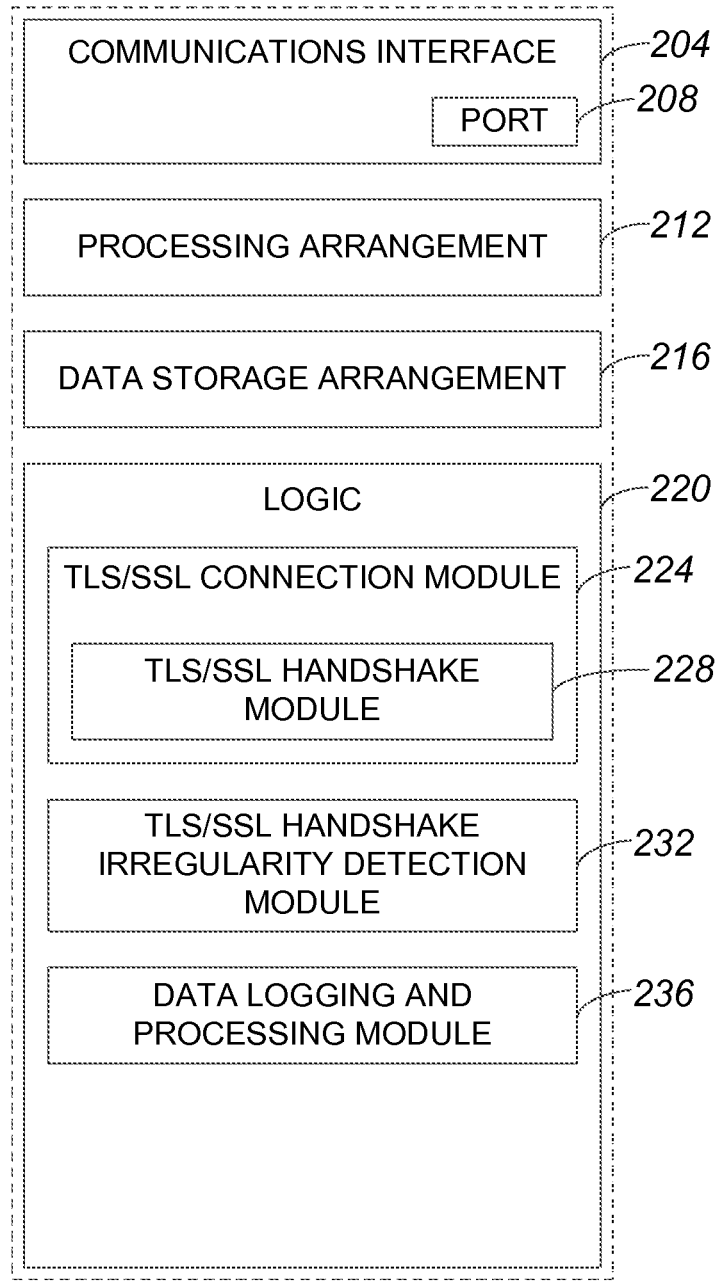
FIG. 2 is a diagrammatic representation of a network element or node that is configured to engage in Transport Layer Security or Secure Sockets Layer (TLS/SSL) handshakes in accordance with an embodiment.

FIG. 2 is a diagrammatic representation of an endpoint, e.g., a network element or node, which is configured to engage in TLS/SSL handshakes in accordance with an embodiment. An endpoint 244 may be a client device such as a desktop computer, a laptop computer, a tablet, a smart phone, and/or the like. Endpoint 244 includes a communications interface 204, a processing arrangement 212, a data storage arrangement 216, and logic 220. A communications interface 204 generally allows endpoint 244 to communicate with other elements, e.g., endpoints, on a network. Communications interface 204 may include at least one port 208. Processing arrangement 212 typically includes at least one processor which is arranged to execute software included in logic 220. Data storage arrangement 216 may store data or information used by and/or obtained by endpoint 244, e.g., certificates from certificate authorities and trusted root certificates.

Logic 220 may include hardware and/or software logic, e.g., computer program codes, embodied on a computer readable medium. Logic 220 includes a TLS/SSL connection logic module, a TLS/SSL handshake irregularity detection module 232, and a data logging and processing module 236. TLS/SSL connection module 224 is generally arranged to allow endpoint 244 to establish and maintain connections to other endpoints, and includes a TLS/SSL handshake module 228. TLS/SSL handshake module 228 is configured to support TLS/SSL handshakes between endpoint 244 and other endpoints. TLS/SSL handshake irregularity detection module 232 is configured to detect irregularities or unusual behavior associated with a TLS/SSL handshake process. By way of example, TLS/SSL handshake irregularity detection module 232 may identify when a TLS/SSL handshake is abandoned by endpoint 244. Data logging and processing module 236 is arranged to store data such as data pertaining to certificates into data storage arrangement 216, to obtain data from data storage arrangement 216, and to process data.

Figure 3:
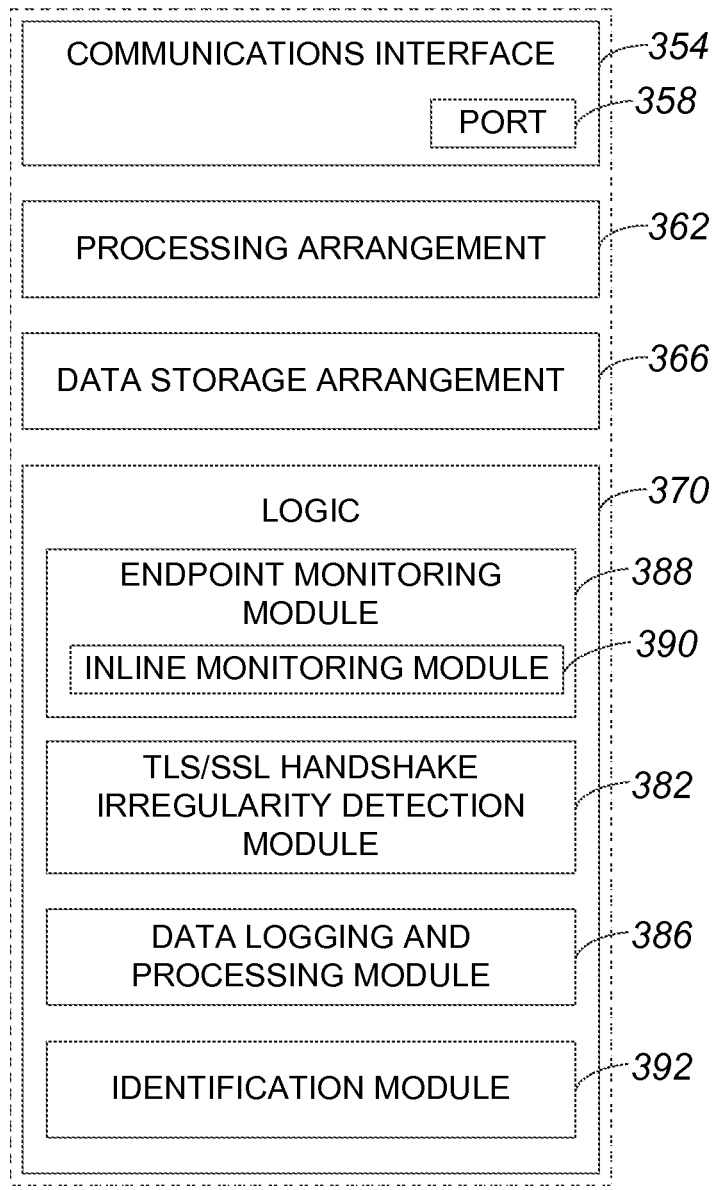
FIG. 3 is a diagrammatic representation of a network element or node that is configured to determine whether an endpoint is potentially infected by malicious software in accordance with an embodiment.

With reference to FIG. 3, a network element or node that is configured to determine whether an endpoint is potentially infected by malicious software will be described in accordance with an embodiment. A network element 348 which may generally monitor communications between endpoints on a network to identify unusual behavior pertaining to TLS/SSL handshakes includes a communications interface 354, a processing arrangement 362, a data storage arrangement 366, and logic 370. Communications interface 354 generally allows network element 348 to communicate with other elements on a network, and typically includes at least one port 358. Processing arrangement 362 typically includes at least one processor which is arranged to execute software included in logic 370. Data storage arrangement 366 is generally arranged to store data such that the data, e.g., telemetry or historical data associated with the operation of a network of which network element 348 is a component, may be readily accessible by network element 348.

Logic 370 may include hardware and/or software logic embodied on a computer readable medium. Logic 370 includes an endpoint monitoring module 388, a TLS/SSL handshake irregularity detection module 382, and data logging and processing logic 386. Logic 370 also includes an identification module 392. Endpoint monitoring module 388 is generally arranged to observe communications between endpoints or, more generally, communications within a network. For example, endpoint monitoring module 388 may be arranged to monitor activities and data associated with TLS/SSL proxies within a network when the TLS/SSL proxies are being inserted. Endpoint monitoring module 388 includes an inline monitoring module 390 which monitors communications substantially in-line. TLS/SSL handshake irregularity detection module 382 is configured to identify irregular or unusual behavior pertaining to a TLS/SSL handshake, e.g., an abandoned TLS/SSL handshake. Data logging and processing module 386 is configured to obtain and to process data obtained by endpoint monitoring module 388 and TLS/SSL handshake irregularity detection module 382. The data may be stored into data storage arrangement and may also be retrieved from data storage arrangement 366 by data logging and processing module 386. In one embodiment, data logging and processing module 386 may obtain telemetry and historical data from data storage arrangement 366, and identification module 392 may use the obtained data to assess whether unusual TLS/SSL handshake behavior is likely to indicate the presence of malicious software on an endpoint of a network. Identification module 392 is generally arranged to identify whether an endpoint of a network is likely to be infected or otherwise compromised by malicious software. In one embodiment, identification module 392 is configured to ascertain whether unusual TLS/SSL handshake behavior detected by TLS/SSL irregularity detection module 382 is indicative of the presence of malicious software. Identification module 392 may be arranged to apply suitable techniques to increase the likelihood or probability that endpoints which may be infected by malicious software are accurately identified.

Figure 4:
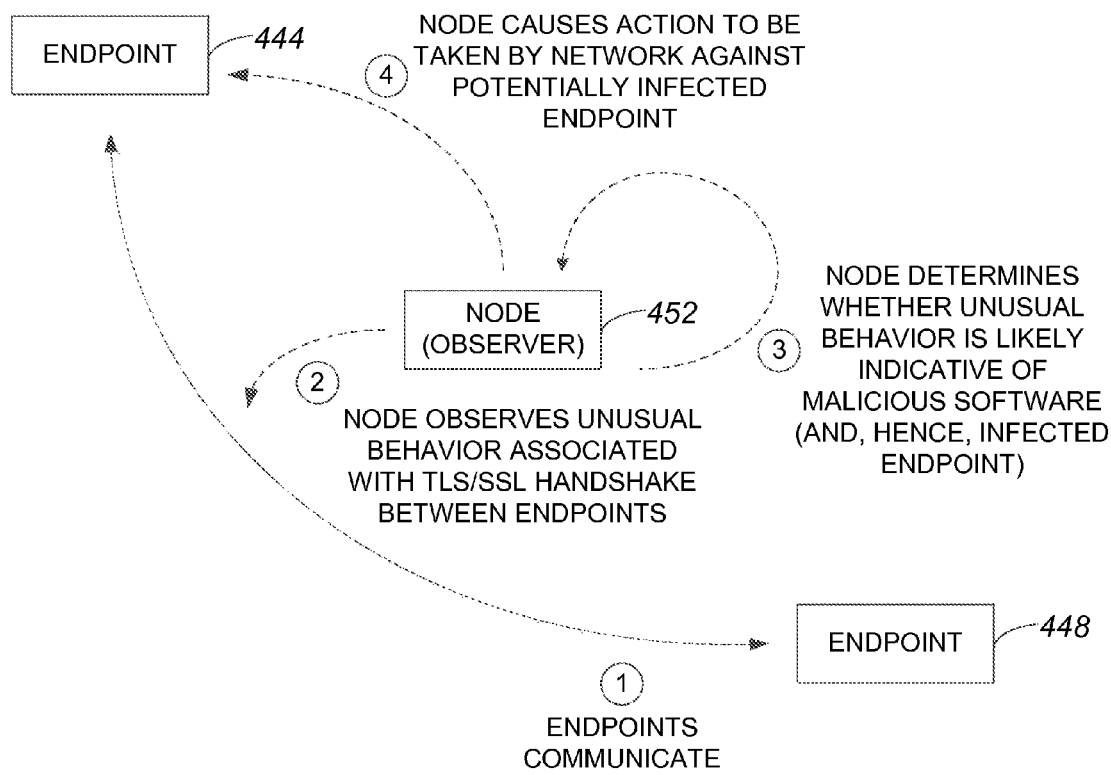
FIG. 4 is a block diagram representation of a network in which a node monitors communications between endpoints to determine whether malicious software is likely to be present in accordance with an embodiment.

FIG. 4 is a block diagram representation of a network in which a node monitors communications between endpoints to ascertain whether malicious software is likely to be present with respect to at least one of the endpoints in accordance with an embodiment. A network 400 includes endpoints 444, 448 and a node 452, e.g., an observer. Node 452 may be arranged to monitor communications between endpoint 444 and endpoint 448.

At a time t1, endpoint 444 and endpoint 448 communicate with each other, e.g., endpoint 444 and endpoint 448 attempt a TLS/SSL handshake. At a time t2, node 452 observes unusual behavior associated with the TLS/SSL handshake between endpoint 444 and endpoint 448. In one embodiment, the unusual behavior may be an abandoned TLS/SSL handshake. Such an abandoned TLS/SSL handshake may be a result of an attempt by network 400 to proxy a connection between endpoint 444 and endpoint 448 using a TLS/SSL proxy.

After detecting the unusual behavior associated with the TLS/SSL handshake between endpoint 444 and endpoint 448, node 452 determines at a time t3 whether the unusual behavior associated with the TLS/SSL handshake is likely indicative of malicious software and, hence, endpoint 444 and/or endpoint 448 being infected or otherwise compromised by malicious software. When an endpoint 444, 448 is identified as likely being infected, node 452 may cause action to be taken by network 400 against the potentially infected endpoint. In the described embodiment, endpoint 444 may be identified as potentially being infected. As such, at time t4, node 452 causes action to be taken by network 400 with respect to endpoint 444.

Figure 5A:
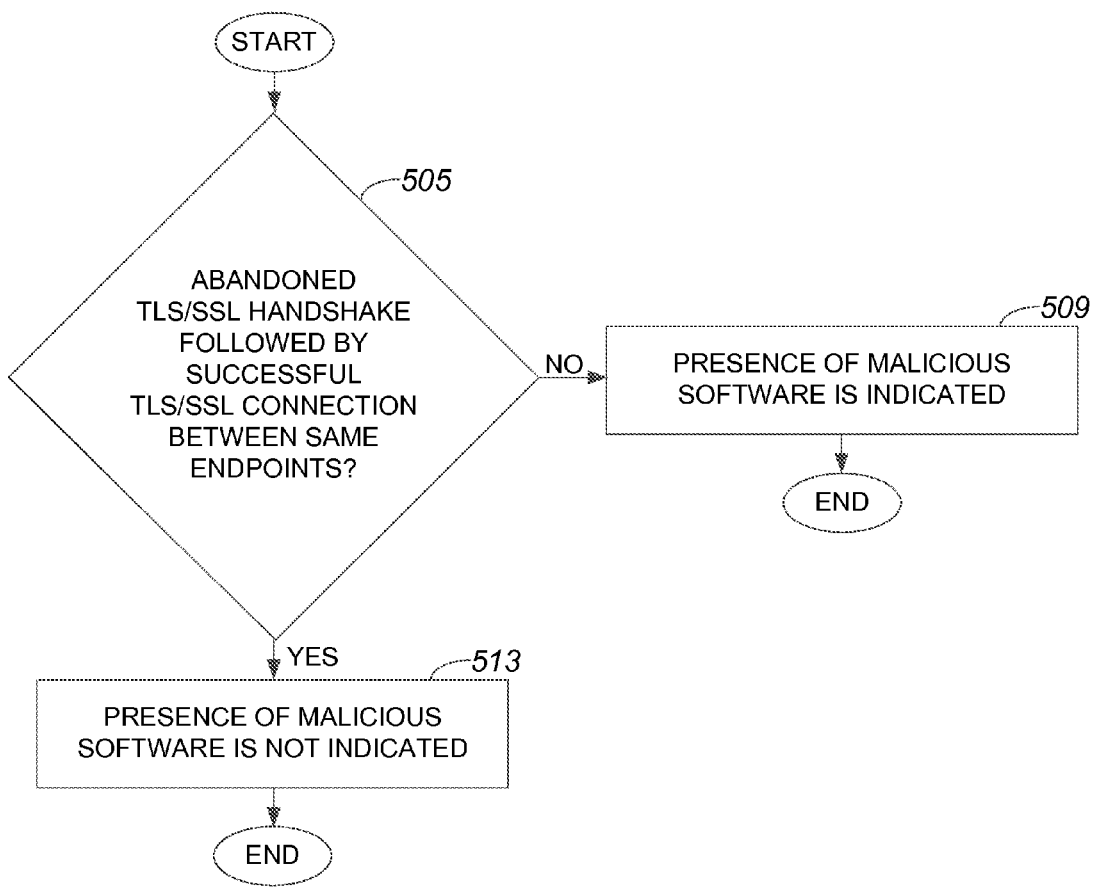
FIG. 5A is a process flow diagram which illustrates a first method for determining a likelihood that unusual TLS/SSL handshake behavior indicates presence of malicious software, e.g., step 109 of FIG. 1, in accordance with an embodiment.
Figure 5B:
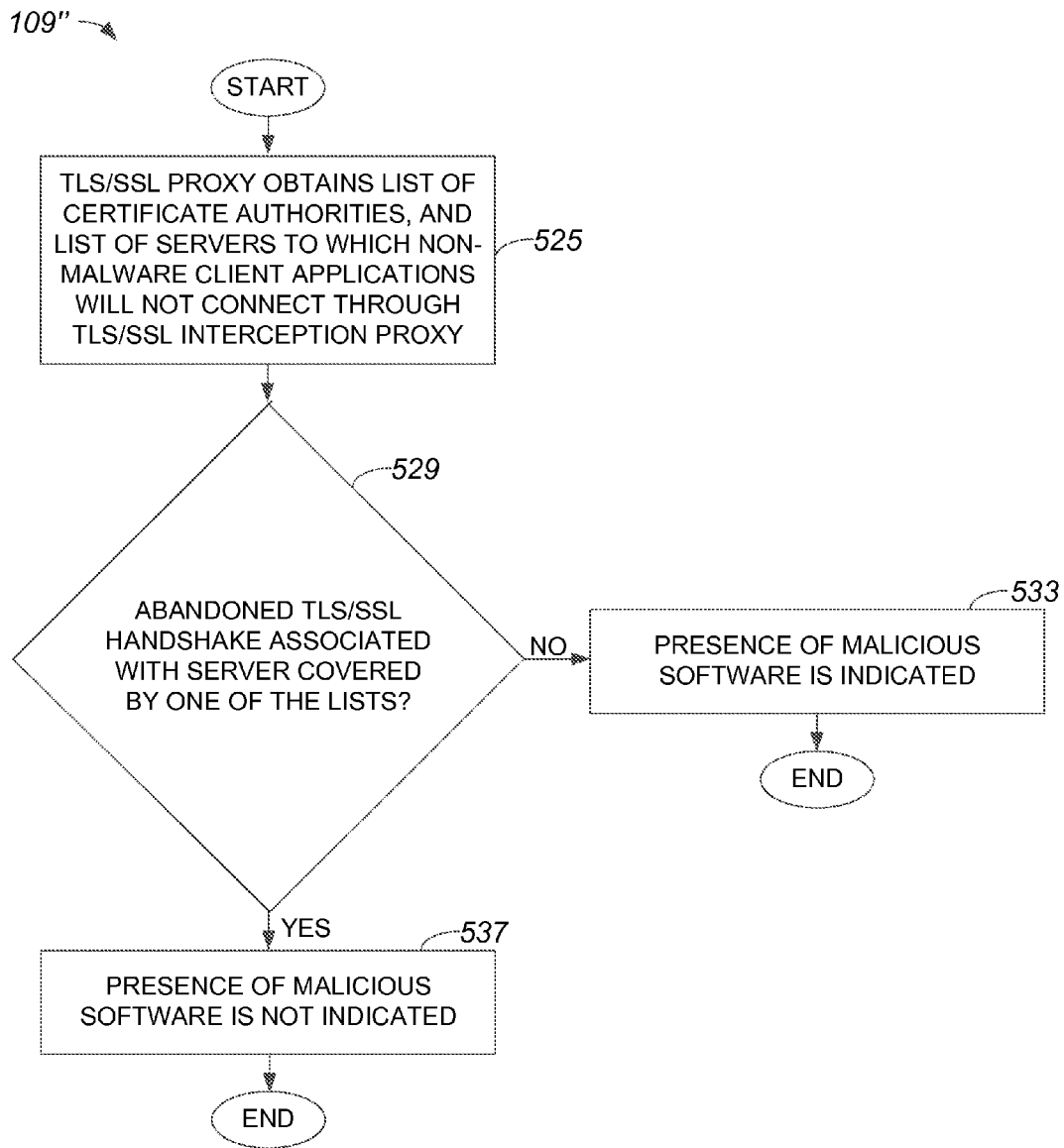
FIG. 5B is a process flow diagram which illustrates a second method for determining a likelihood that unusual TLS/SSL handshake behavior indicates presence of malicious software, e.g., step 109 of FIG. 1, in accordance with an embodiment.
Figure 5C:
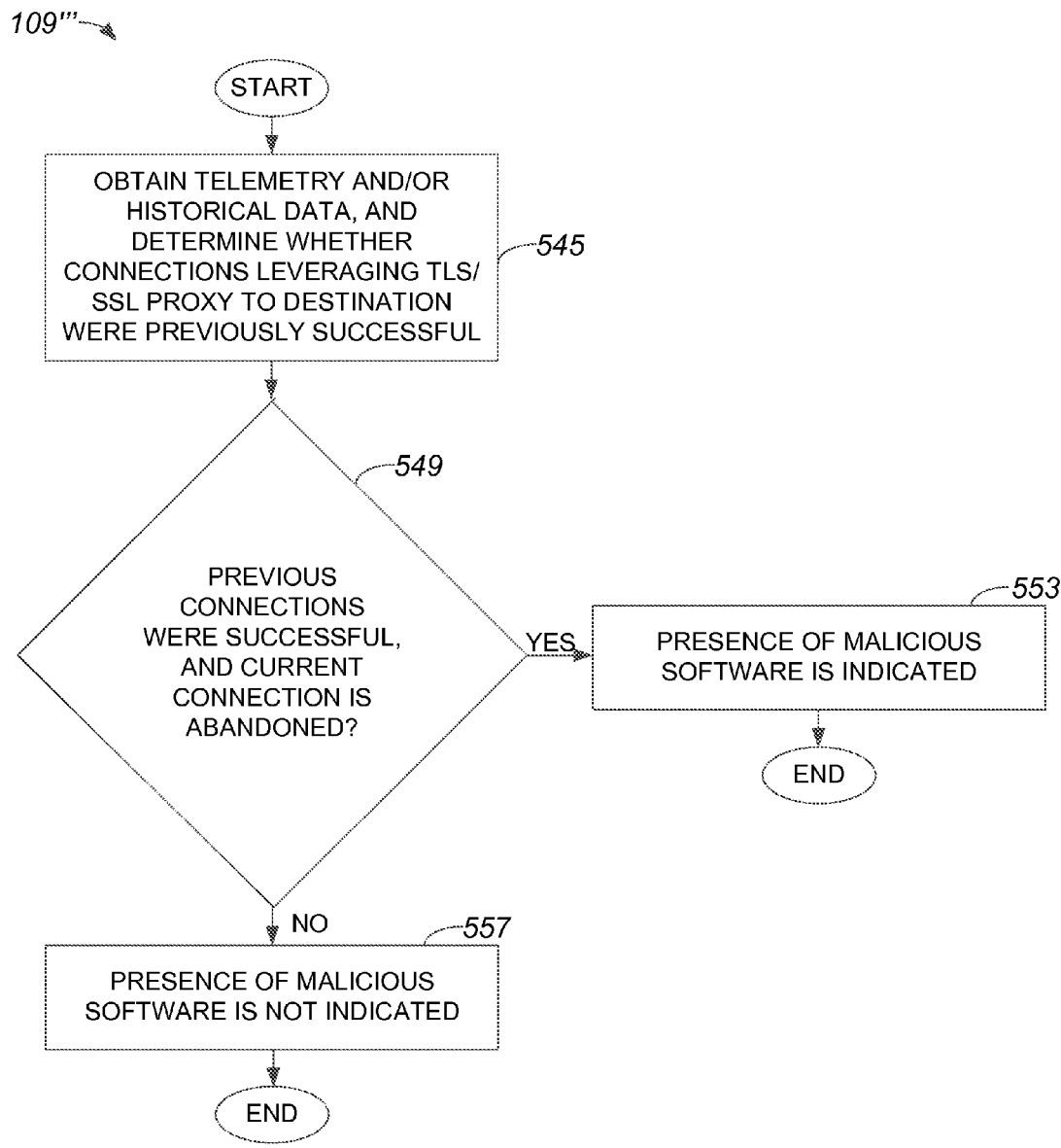
FIG. 5C is a process flow diagram which illustrates a first method for determining a likelihood that unusual TLS/SSL handshake behavior indicates presence of malicious software, e.g., step 109 of FIG. 1, in accordance with an embodiment.

As mentioned above with respect to FIG. 1, any number of suitable techniques or methods may be used to determine a likelihood that observed unusual TLS/SSL handshake behavior indicates the presence of malicious software. With reference to FIGS. 5A-C, examples of suitable techniques that may be used to determine a likelihood that observed unusual TLS/SSL handshake behavior indicates the presence of malicious software will be described. It should be appreciated that the techniques described in FIGS. 5A-C may be implemented individually or implemented together in any combination. That is, any number of techniques may be used in a determination of whether unusual TLS/SSL handshake behavior indicates the presence of malicious software.

In one embodiment, information relating to whether an abandoned TLS/SSL handshake is followed by a successful TLS/SSL connection may be used to assess whether the abandoned TLS/SSL handshake is indicative of the presence of malicious software. FIG. 5A is a process flow diagram which illustrates a method for determining a likelihood that unusual TLS/SSL handshake behavior such as an abandoned TLS/SSL handshake indicates the presence of malicious software, e.g., step 109 of FIG. 1, in accordance with an embodiment. A method 109' of determining whether unusual TLS/SSL handshake behavior indicates the presence of malicious software begins at step 505 in which the unusual TLS/SSL handshake behavior, which is an abandoned TLS/SSL handshake in the described embodiment, is followed by a successful TLS/SSL connection between the same endpoints. In other words, it is determined whether an abandoned TLS/SSL handshake between two endpoints is subsequently followed by a successful TLS/SSL connection between the two endpoints.

If it is determined in step 505 that the abandoned TLS/SSL handshake is followed by a successful TLS/SSL connection, then the indication may be that TLS was implemented incorrectly, thereby causing a failed connection followed by a successful SSL connection. It should be understood that a successful TLS/SSL connection after an abandoned TLS/SSL handshake is generally not considered to be an indication of malicious software. As such, the presence of malicious software is not indicated in step 513, and the method of determining a likelihood that unusual handshake behavior indicates the presence of malicious software is completed. Alternatively, if the determination in step 505 is that the abandoned TLS/SSL handshake is not followed by a successful TLS/SSL connection, then the presence of malicious software is indicated in step 509, and the method of determining a likelihood that unusual handshake behavior indicates the presence of malicious software is completed.

A TLS/SSL connection may be refused by an application when the TLS/SSL connection is not covered by an appropriate certificate authority. As will be understood by those skilled in the art, a certificate authority issues a certificate that may be used by a client endpoint to verify a signature on a certificate held by a server endpoint before a connection is established. An endpoint such as a client endpoint may possess multiple trusted certificates which effectively identify trusted server endpoints. Referring next to FIG. 5B, a method for determining a likelihood that unusual TLS/SSL handshake behavior indicates presence of malicious software, e.g., step 109 of FIG. 1, which involves utilizing certificate authorities will be described in accordance with an embodiment. A method 109" of determining whether unusual TLS/SSL handshake behavior indicates the presence of malicious software begins at step 525 in which a TLS/SSL interception proxy obtains a list of certificate authorities, as well as a list of servers to which non-malware client applications will not connect through a TLS/SSL interception proxy. A determination is made in step 529 as to whether the unusual TLS/SSL handshake behavior, which is an abandoned TLS/SSL handshake in the described embodiment, is associated with a server covered by one of the lists, e.g., servers to which a non-malware client's applications will not connect through a TLS/SSL interception proxy, obtained in step 525.

If it is determined in step 529 that the abandoned TLS/SSL handshake is not associated with a server covered by the list of certificate authorities and/or the list of servers to which non-malware client applications will not connect through a TLS/SSL interception proxy, the presence of malicious software is indicated in step 533, and the method of determining a likelihood that unusual handshake behavior indicates the presence of malicious software is completed. Alternatively, if the determination in step 529 is that the abandoned TLS/SSL handshake is associated with a server covered by the list of certificate authorities and/or the list of servers to which non-malware client applications will not connect through a TLS/SSL interception proxy, then the presence of malicious software is not indicated in step 537, and the method of determining a likelihood that unusual handshake behavior indicates the presence of malicious software is completed. In other words, an abandoned TLS/SSL handshake associated with a server covered by the list of certificate authorities, and/or the list of servers to which non-malware client applications will not connect through a TLS/SSL interception proxy, does not trigger a process to locate malicious software.

Telemetry and/or historical information may be used to assess whether current unusual TLS/SSL handshake behavior is likely indicative of the presence of malicious software. For example, if unusual TLS/SSL handshake behavior has previously been associated with malicious software, then current unusual TLS/SSL behavior may be considered to be indicative of the presence of malicious software. FIG. 5C is a process flow diagram which illustrates a method for determining a likelihood that unusual TLS/SSL handshake behavior indicates presence of malicious software, e.g., step 109 of FIG. 1, that considers changes in TLS/SSL handshake behavior in accordance with an embodiment. A method 109'" of determining whether unusual TLS/SSL handshake behavior indicates the presence of malicious software begins at step 545 in telemetry and/or historical data is obtained, e.g., from a repository. The telemetry and/or historical data are used to identify whether previous connections that leveraged a TLS/SSL interception proxy to a destination were successful.

A determination is made in step 549 as to whether previous connections were successful while the current connection is abandoned. In one embodiment, such a determination may involve identifying a number of previous connections that were successful, and classifying previous connections as successful if a certain number or a certain percentage of previous connections were successful. If the determination in step 529 is that previous connections were successful while the current connection is abandoned, the presence of malicious software is indicated in step 553, and the method of determining a likelihood that unusual handshake behavior indicates the presence of malicious software is completed. Alternatively, if it is determined in step 549 that previous connections were not successful and that the current connection is abandoned, then the presence of malicious software is not indicated in step 537, and the method of determining a likelihood that unusual handshake behavior indicates the presence of malicious software is completed.

Although only a few embodiments have been described in this disclosure, it should be understood that the disclosure may be embodied in many other specific forms without departing from the spirit or the scope of the present disclosure. By way of example, while an abandoned TLS/SSL handshake has been described as being unusual behavior with respect to a TLS/SSL handshake, unusual behavior with respect to a TLS/SSL handshake is not limited to an abandoned TLS/SSL handshake. In one embodiment, unusual behavior with respect to a TLS/SSL handshake may essentially occur after the TLS/SSL handshake is completed. For instance, a TLS/SSL handshake may be completed, and unusual behavior may be indicated by a failure to send traffic on a connection established as a result of the TLS/SSL handshake.

The use of information relating to unusual handshake behavior to effectively trigger a determination of whether malicious software has infected an endpoint has been described as being suitable for use with respect to TLS and SSL protocols. It should be understood, however, that using unusual handshake behavior to effectively indicate when malicious software is present is not limited to networks which use TLS and SSL protocols. The observation of unusual handshake behavior and the subsequent determination as to whether the unusual handshake behavior is indicative of the presence of malicious software may be utilized in any suitable network including, but not limited to including, a network that uses a Datagram Transport Layer Security {DTL} protocol.

Techniques used to determine a likelihood that unusual TLS/SSL handshake behavior indicates the presence of malicious software may vary widely. While examples of suitable techniques have been described in FIGS. 5A-C, it should be appreciated that suitable techniques are not limited to the examples described in FIGS. 5A-C.

Endpoints in a network may generally include client devices. Client devices may include, but are not limited to including, laptop computers, desktop computers, tablets, and/or smartphones. A network node which monitors communications within the network, as for example to determine whether a particular endpoint is likely infected by malicious software, may be any suitable device in the network. For instance, a network node may be a server. In one embodiment, a network node may be an endpoint.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A tangible, non-transitory computer-readable medium comprising computer program code, the computer program code, when executed, configured to:
   identify unusual behavior with respect to a handshake between a first endpoint and a second endpoint, wherein the first endpoint and the second endpoint are included in a network, wherein the unusual behavior is identified by an observer node included in the network, the observer node being inline on the network between the first endpoint and the second endpoint, the observer node being arranged to obtain communications between the first endpoint and the second endpoint, and wherein the handshake is one selected from a group including a Transport Layer Security (TLS) handshake, a Secure Sockets Layer (SSL) handshake, and a Datagram Transport Layer Security {DTLS} protocol handshake;
   determine whether the unusual behavior with respect to the handshake indicates presence of malicious software, wherein the computer program code configured to determine whether the unusual behavior with respect to the handshake indicates the presence of the malicious software includes computer program code configured to use at least one selected from a group including telemetry data and historical data associated with the network to determine a likelihood that the unusual behavior with respect to the handshake indicates the presence of the malicious software; and
   identify at least one of the first endpoint and the second endpoint as potentially being infected by the malicious software if it is determined that the unusual behavior with respect to the handshake indicates the presence of the malicious software, wherein the at least one selected from the group including the telemetry data and the historical data includes an indication of whether at least one previous connection between the first endpoint and the second endpoint that leveraged an interception proxy was successful, wherein if the at least one previous connection was successful, the presence of the malicious software is indicated.

2. An apparatus comprising:
   logic, the logic including a monitoring module, a detection module, and an identification module, the monitoring module being configured to monitor communications on a network by intercepting the communications between endpoints in the network, the communications on the network including handshake communications, wherein the detection module is configured to detect when the handshake communications include an unusual handshake communication, and wherein the identification module is arranged to determine when the unusual handshake communication indicates that at least one endpoint is compromised by malicious software;
   a processing arrangement, wherein the logic includes computer program code and wherein the processing arrangement is configured to execute the computer program code; and
   a data storage arrangement, the data storage arrangement being configured to store least one selected from a group including historical information associated with the network and telemetry information associated with the network, wherein the identification module is configured to use the at least one selected from the group including the historical information associated with the network and the telemetry information associated with the network to determine when the unusual handshake communication indicates that the at least one endpoint is compromised by the malicious software, wherein the at least one selected from the group including the telemetry data and the historical data includes an indication of whether at least one previous connection between the first endpoint and the second endpoint that leveraged an interception proxy was successful, wherein if the at least one previous connection was successful, the presence of the malicious software is indicated.

3. A method comprising:
   identifying unusual behavior with respect to a handshake between a first endpoint and a second endpoint, wherein the first endpoint and the second endpoint are included in a network, wherein the unusual behavior is identified by an observer node included in the network, the observer node being inline on the network between the first endpoint and the second endpoint, the observer node being arranged to obtain communications between the first endpoint and the second endpoint and wherein the handshake is one selected from a group including a Transport Layer Security (TLS) handshake, a Secure Sockets Layer (SSL) handshake, and a Datagram Transport Layer Security {DTLS} protocol handshake;

determining whether the unusual behavior with respect to the handshake indicates presence of malicious software, wherein determining whether the unusual behavior with respect to the handshake indicates the presence of the malicious software includes using at least one selected from a group including telemetry data and historical data associated with the network to determine a likelihood that the unusual behavior with respect to the handshake indicates the presence of the malicious software; and identifying at least one of the first endpoint and the second endpoint as potentially being infected by the malicious software if it is determined that the unusual behavior with respect to the handshake indicates the presence of the malicious software, wherein the at least one selected from the group including the telemetry data and the historical data includes an indication of whether at least one previous connection between the first endpoint and the second endpoint that leveraged an interception proxy was successful, wherein if the at least one previous connection was successful, the presence of the malicious software is indicated.

* * * * *